US011225332B2

(12) United States Patent
Pike (10) Patent No.: US 11,225,332 B2
(45) Date of Patent: Jan. 18, 2022

(54) UNMANNED AERIAL VEHICLE PROVIDED WITH DETACHABLE MOTOR ARMS

(71) Applicant: James Thomas Pike, Waterloo (CA)

(72) Inventor: James Thomas Pike, Waterloo (CA)

( * ) Notice: Subject to any disclaimer, the term of this patent is extended or adjusted under 35 U.S.C. 154(b) by 365 days.

(21) Appl. No.: 16/285,614

(22) Filed: Feb. 26, 2019

(65) Prior Publication Data

US 2019/0263530 A1 Aug. 29, 2019

Related U.S. Application Data

(60) Provisional application No. 62/635,335, filed on Feb. 26, 2018.

(51) Int. Cl.
| | |
|---|---|
| *B64D 27/26* | (2006.01) |
| *B64C 27/08* | (2006.01) |
| *B64C 25/32* | (2006.01) |
| *B64C 39/02* | (2006.01) |

(52) U.S. Cl.
CPC .............. *B64D 27/26* (2013.01); *B64C 25/32* (2013.01); *B64C 27/08* (2013.01); *B64C 39/024* (2013.01); *B64C 2025/325* (2013.01); *B64C 2201/024* (2013.01); *B64C 2201/042* (2013.01); *B64C 2201/108* (2013.01); *B64C 2201/165* (2013.01); *B64C 2201/20* (2013.01)

(58) Field of Classification Search
CPC .............. B64C 1/062; B64C 2201/027; B64C 2201/108; B64C 2201/165; B64C 39/024; B64C 2001/0054; B64C 2025/325; B64C 2201/024; B64C 2201/042; B64C 2201/20; B64C 2211/00; B64C 25/32; B64C 27/08; B64C 27/26; Y10T 403/11; Y10T 403/7182; B64D 27/26
See application file for complete search history.

(56) References Cited

U.S. PATENT DOCUMENTS

| | | | | |
|---|---|---|---|---|
| 4,610,560 | A * | 9/1986 | Miller | A47F 5/105 |
| | | | | 16/366 |
| 5,204,069 | A * | 4/1993 | Paxton | B05B 7/0807 |
| | | | | 422/185 |
| 5,316,818 | A * | 5/1994 | Hilliard | B62D 7/16 |
| | | | | 428/99 |
| 5,445,423 | A * | 8/1995 | Mader | E05B 15/004 |
| | | | | 292/336.3 |

(Continued)

*Primary Examiner* — Medhat Badawi
(74) *Attorney, Agent, or Firm* — Asgaard Patent Services, LLC; F. Wayne Thompson, Jr.

(57) ABSTRACT

The unmanned aerial vehicle (UAV) includes detachable motor arms. In this way, the UAV may be conveniently stored and transported, rapidly assembled in the field, and repaired in the event of a crash. The motor arms are also configured to separate from the fuselage in the event of a crash. An example unmanned aerial vehicle comprises: a fuselage and two motor arms. Each motor arm is detachably secured to the fuselage by two mechanical connectors and comprises a tube having a rotary wing propulsion system on each end and an electrical connector, positioned between the two rotary wing propulsion systems, configured to conductively interface with an electrical connector in an underside of the fuselage. The two mechanical connectors detachably securing each motor arm to the fuselage are configured to facilitate the separation of that motor arm from the fuselage during a crash.

13 Claims, 10 Drawing Sheets

(56) References Cited

U.S. PATENT DOCUMENTS

| | | | | |
|---|---|---|---|---|
| 5,626,355 | A * | 5/1997 | Voss | B62K 19/30 |
| | | | | 188/DIG. 1 |
| 6,146,050 | A * | 11/2000 | Marshall | E04H 15/24 |
| | | | | 135/100 |
| 6,422,783 | B1 * | 7/2002 | Jordan | E01F 9/685 |
| | | | | 256/13.1 |
| 8,322,648 | B2 | 12/2012 | Kroetsch et al. | |
| 10,974,823 | B2 * | 4/2021 | Van Niekerk | B64D 47/08 |
| 2009/0180830 | A1 * | 7/2009 | MacLean | F16B 5/025 |
| | | | | 403/348 |
| 2009/0283629 | A1 * | 11/2009 | Kroetsch | A63H 27/12 |
| | | | | 244/17.23 |
| 2013/0236234 | A1 * | 9/2013 | Kaczynski | B64G 1/645 |
| | | | | 403/2 |
| 2018/0022451 | A1 * | 1/2018 | Lim | B64D 47/06 |
| | | | | 244/17.23 |
| 2018/0290749 | A1 * | 10/2018 | Luo | B64C 39/024 |
| 2019/0263530 | A1 * | 8/2019 | Pike | B64C 27/08 |
| 2019/0276128 | A1 * | 9/2019 | Pike | B64C 27/32 |
| 2020/0398966 | A1 * | 12/2020 | Harris | B64C 1/063 |

* cited by examiner

FIG. 10 ental Application Ser. No. 62/635,335, filed on Feb. 26, 2018, the entirety of which is incorporated herein by reference.

UNMANNED AERIAL VEHICLE PROVIDED WITH DETACHABLE MOTOR ARMS

CROSS REFERENCE TO RELATED APPLICATION

This application claims the benefit of U.S. Provisional Application Ser. No. 62/635,335, filed on Feb. 26, 2018, the entirety of which is incorporated herein by reference.

TECHNICAL FIELD

This disclosure relates to implementations of an unmanned aerial vehicle (UAV) provided with detachable motor arms. In particular, the present invention is directed to implementations of a mechanical connector that can be used to secure a motor arm and/or a leg to the fuselage of a UAV.

BACKGROUND

An unmanned aerial vehicle (UAV), also known as a drone, is an aircraft without a human pilot aboard. UAV's are a component of an unmanned aircraft system (UAS) which includes a UAV and a ground-based controller that are connected by a two-way communication system. UAVs are often equipped with cameras, infrared devices, and other equipment according to its intended use, for example, surveillance, communication/information broadcasting, etc.

Unmanned aerial vehicles (UAVs) are at constant risk of hard landings, collisions, and crashes. Often, an arm part, propulsion system, or the fuselage of a UAV is damaged during one of those events. As its quite expensive to replace a UAV, its beneficial to configure a UAV so that its better able to survive a hard landing, collision, or crash.

Accordingly, it can be seen that needs exist for the unmanned aerial vehicle provided with detachable motor arms disclosed herein. It is to the provision of an unmanned aerial vehicle provided with detachable motor arms that is configured to address these needs, and others, that the present invention is primarily directed.

SUMMARY OF THE INVENTION

The unmanned aerial vehicle (UAV) includes detachable motor arms. In this way, the UAV may be conveniently stored and transported, rapidly assembled in the field, and repaired in the event of a crash. The motor arms are also configured to separate from the fuselage in the event of a crash. In this way, damage to the motor arms and/or fuselage of the UAV may be minimized or prevented.

An example unmanned aerial vehicle comprises: a fuselage and two motor arms. Each motor arm is detachably secured to the fuselage by two mechanical connectors and comprises a tube having a rotary wing propulsion system on each end and an electrical connector, positioned between the two rotary wing propulsion systems, configured to conductively interface with an electrical connector in an underside of the fuselage. The two mechanical connectors detachably securing each motor arm to the fuselage are configured to facilitate the separation of that motor arm from the fuselage during a crash. Each mechanical connector is a discrete component that comprises two breakaway pegs extending from a first side and a mounting clamp on a bottom end.

Another example unmanned aerial vehicle comprises: a fuselage and two motor arms. Each motor arm is detachably secured to the fuselage by two mechanical connectors and comprises a tube having a rotary wing propulsion system on each end and an electrical connector, positioned between the two rotary wing propulsion systems, configured to conductively interface with an electrical connector in an underside of the fuselage. The two mechanical connectors detachably securing each motor arm to the fuselage are configured to facilitate the separation of that motor arm from the fuselage during a crash. Each mechanical connector is a discrete component that comprises a body portion having two flexible arms, each flexible arm includes a breakaway peg that extends from a distal end.

BRIEF DESCRIPTION OF THE DRAWINGS

Like reference numerals refer to corresponding parts throughout the several views of the drawings.

DETAILED DESCRIPTION

FIGS. 1-3A illustrate an example implementation of an unmanned aerial vehicle (UAV) 100 provided with detachable motor arms 110. In this way, the UAV 100 may be conveniently stored and transported, rapidly assembled in the field, and repaired in the event of a crash. In some implementations, the motor arms 110 may be configured to separate from the fuselage 102 of the UAV 100 upon crashing into the ground and/or another object. In this way, damage to the motor arms 110 and/or the fuselage 102 of the UAV 100 may be minimized or prevented.

As shown in FIGS. 1-3A, in some implementations, an example UAV 100 may comprise a fuselage 102 having a first motor arm 110a and a second motor arm 110b (collectively motor arms 110) detachably secured thereto, each motor arm 110a, 110b is detachably secured to the fuselage 102 by two mechanical connectors 120 (or fuses) and comprises a tube 112 having a rotary wing propulsion system 107 on each end thereof. In some implementations, each motor arm 110a, 110b further comprises an electrical connector 115 positioned between the two rotary wing propulsion systems 107 thereon that is configured to conductively interface with an electrical connector 103 in the underside of the fuselage 102 (see, e.g., FIGS. 4B and 5). In this way, each rotary wing propulsion system 107 may be conductively connected to the electrical components (e.g., a radio system, power source(s), control system(s), etc.) housed within the fuselage 102 of the UAV 100. One of ordinary skill in the art would know how to select an appropriate rotary wing propulsion system for the UAV 100 disclosed herein.

Figure 1:
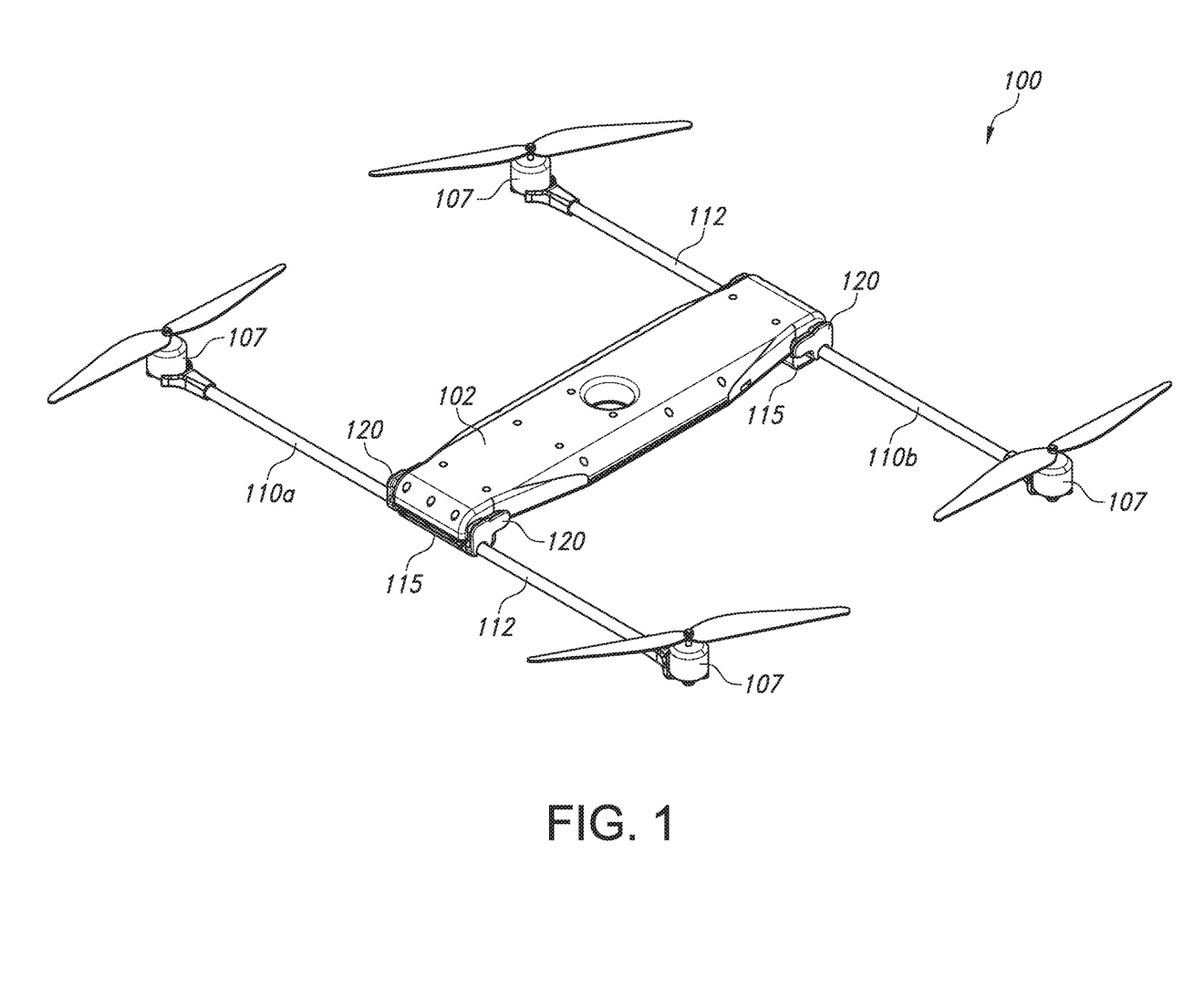
FIG. 1 illustrates an example unmanned aerial vehicle (UAV) provided with detachable motor arms according to the principles of the present disclosure.
Figure 2:
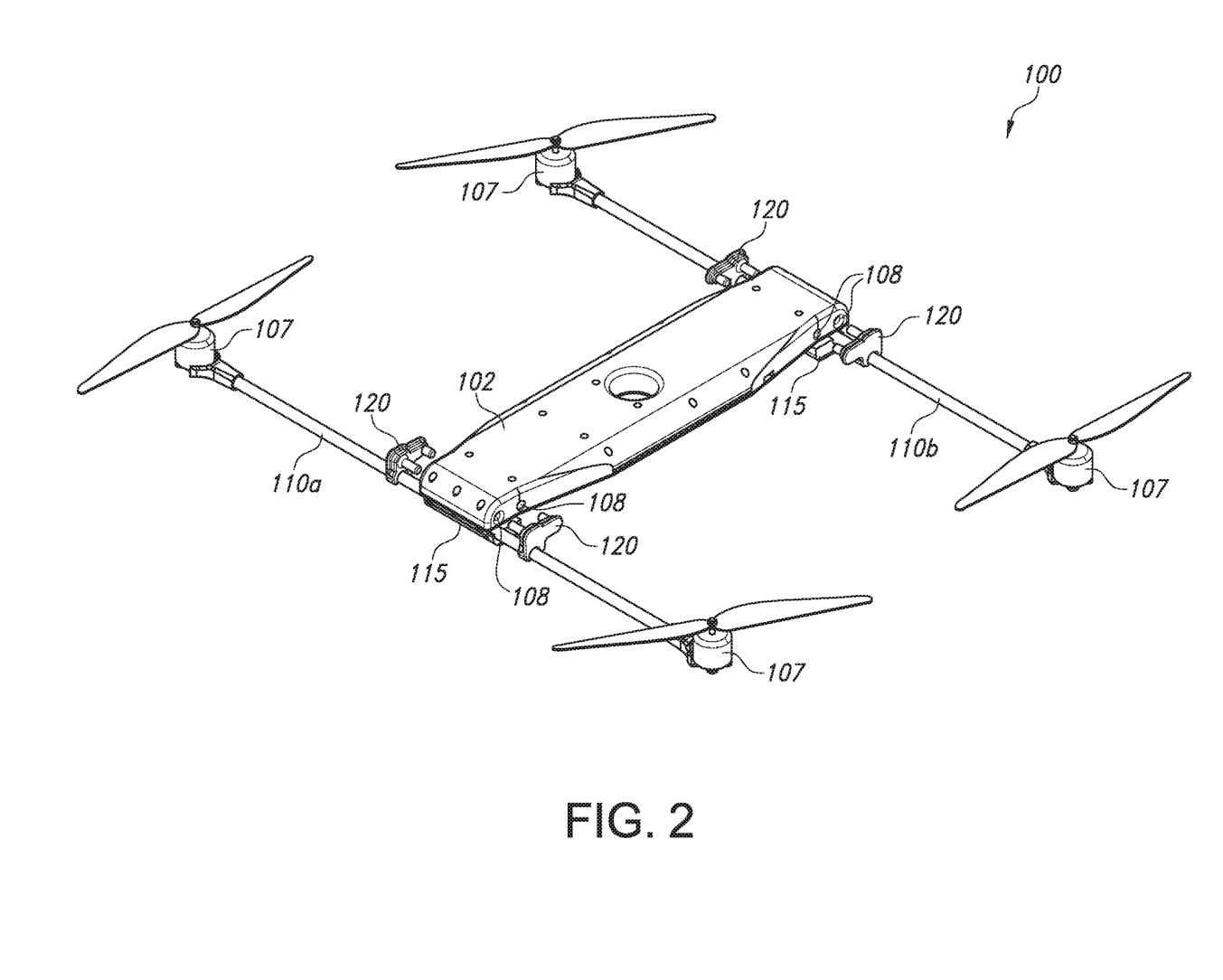
FIG. 2 illustrates the UAV provided with detachable motor arms shown in FIG. 1, wherein the mechanical connectors securing the motor arms to the fuselage are shown exploded therefrom.

As shown in FIG. 1, in some implementations, the two mechanical connectors 120 securing each motor arm 110a, 110b to the fuselage 102 of the UAV 100 may be configured to maintain the conductive connection between the electrical connector 115 of the motor arm 110a, 110b and a corresponding electrical connector 103 in the underside of the fuselage 102.

Figure 3A:
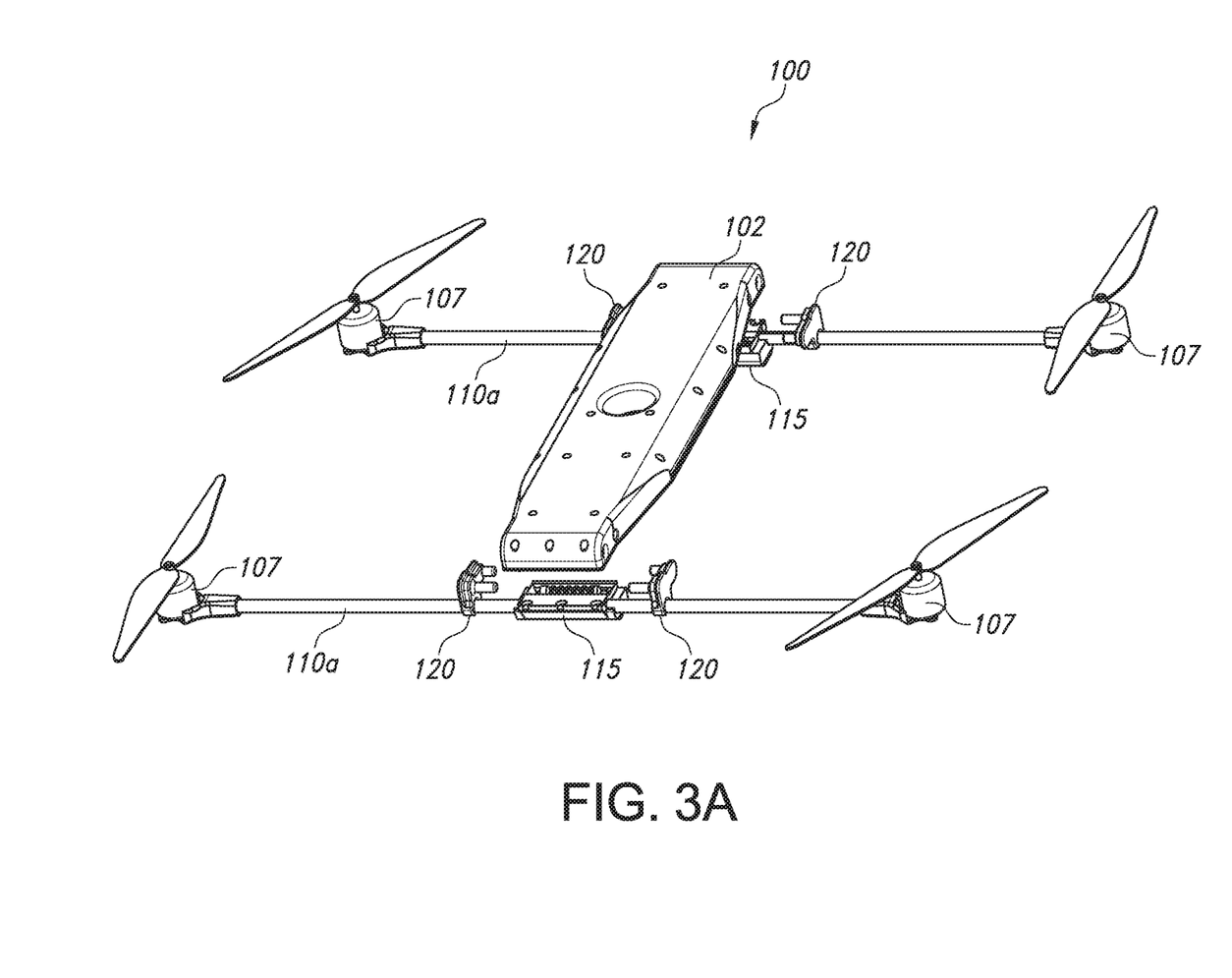
FIG. 3A illustrates an exploded view of the UAV provided with detachable motor arms shown in FIG. 1.
Figure 3B:
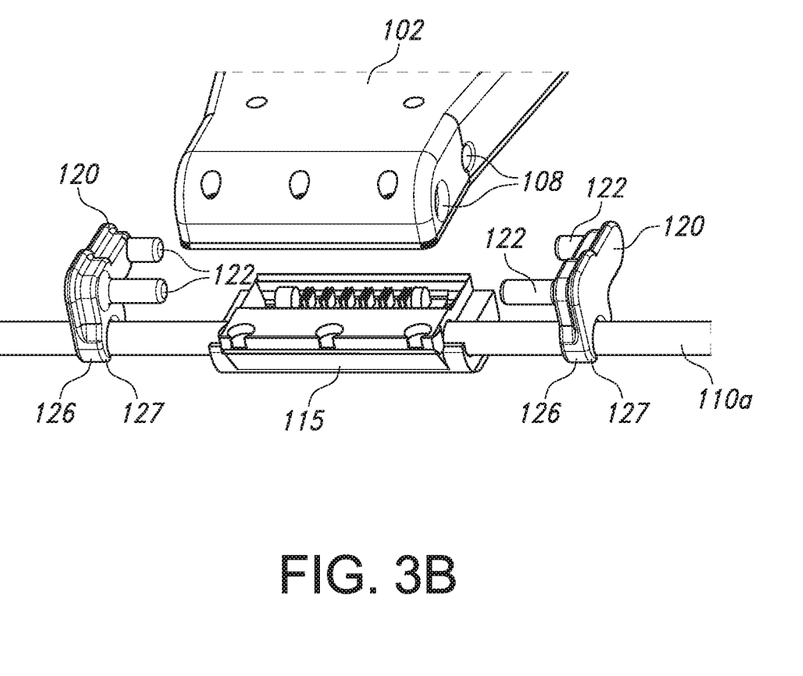
FIG. 3B illustrates a detailed view of the front portion of the UAV provided with detachable motor arms shown in FIG. 3A.
Figure 4A:
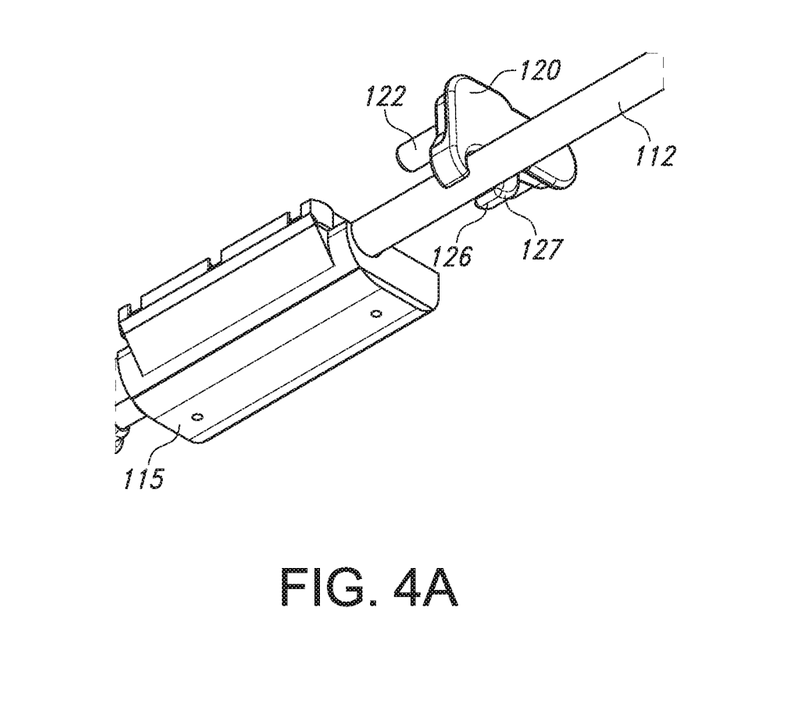
FIG. 4A illustrates a portion of an example motor arm according to the principles of the present disclosure, wherein a mechanical connector is secured to the tube thereof.
Figure 4B:
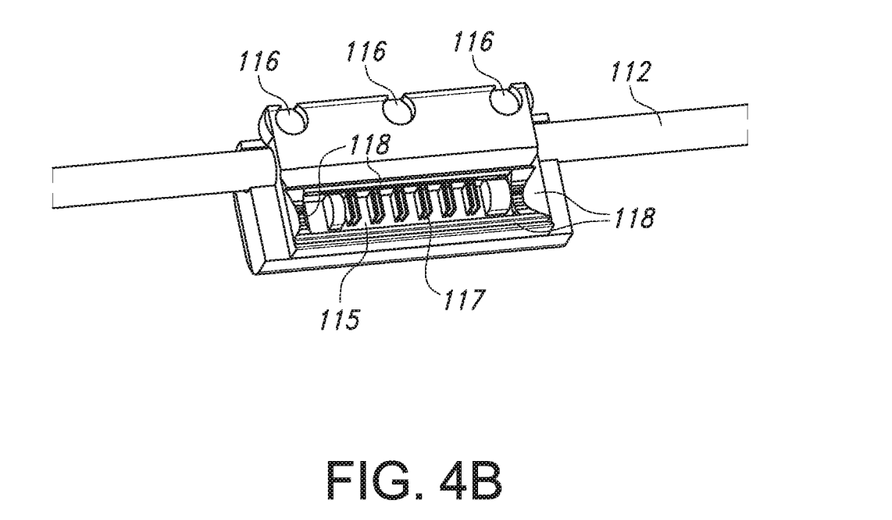
FIG. 4B illustrates a portion of an example motor arm according to the principles of the present disclosure, wherein the underside of an electrical connector is shown.

As shown in FIGS. 1, 3B, and 4, in some implementations, the two mechanical connectors 120 securing each motor arm 110a, 110b to the fuselage 102 of the UAV 100 may be configured to facilitate the separation of the motor arm 110a, 110b from the fuselage 102 during a crash. In this way, damage to the motor arms 110 and/or the fuselage 102 of the UAV 100 may be minimized or prevented. In some implementations, the two mechanical connectors 120 securing a motor arm 110a, 110b to the fuselage 102 of the UAV 100 may be configured to separate from the fuselage 102 during a crash. In some implementations, the two mechanical connectors 120 securing a motor arm 110a, 110b to the fuselage of the UAV 100 may be configured to release the motor arm 110a, 110b if sufficient force (e.g., torque) is applied thereto in the correct direction.

As shown in FIGS. 3B and 4, in some implementations, each mechanical connector 120 may comprise two breakaway pegs 122 extending from a first side thereof and a mounting clamp 126 on a bottom end thereof. In some implementations, there may be more than two breakaway pegs 122 extending from the first side of a mechanical connector 120.

As shown in FIG. 3B, in some implementations, the breakaway pegs 122 of each mechanical connector 120 are configured to be inserted and secured within cooperating sockets 108 located in a side of the fuselage 102 of the UAV 100. In this way, a motor arm 110a, 110b may be secured by a pair of mechanical connectors 120 to the fuselage 102 of the UAV 100 (see, e.g., FIG. 1). In some implementations, each breakaway peg 122 may be any shape suitable for being secured within a cooperating socket 108 in the fuselage 102 of the UAV 100. In some implementations, the breakaway pegs 122 are each configured to break (e.g., shaped and/or constructed from a suitable material) when sufficient force (e.g., torque) is applied thereto, such as during a crash. In this way, a motor arm 110a, 110b secured by a pair of mechanical connectors 120 to the fuselage 102 can separate therefrom during a crash and thereby minimize or prevent damage to the fuselage 102 and/or the motor arm 110a, 110b.

In the event of a crash that results in the destruction of one or more mechanical connectors 120, the UAV 100 can be easily reassembled using replacement mechanical connectors 120.

As shown in FIG. 4A, in some implementations, the mounting clamp 126 of each mechanical connector 120 may be configured to secure about the tube 112 of a motor arm 110a, 110b. In some implementations, each mounting clamp 126 may comprise a C-shaped section 127 with an inner diameter that is smaller than, or the same as, an exterior diameter of a motor arm tube 112. In some implementations, the C-shaped section 127 may comprise two curved branches 129a, 129b configured to resiliently deform and thereby secure about the tube 112 of a motor arm 110a, 110b (see, e.g., FIG. 5).

Figure 5:
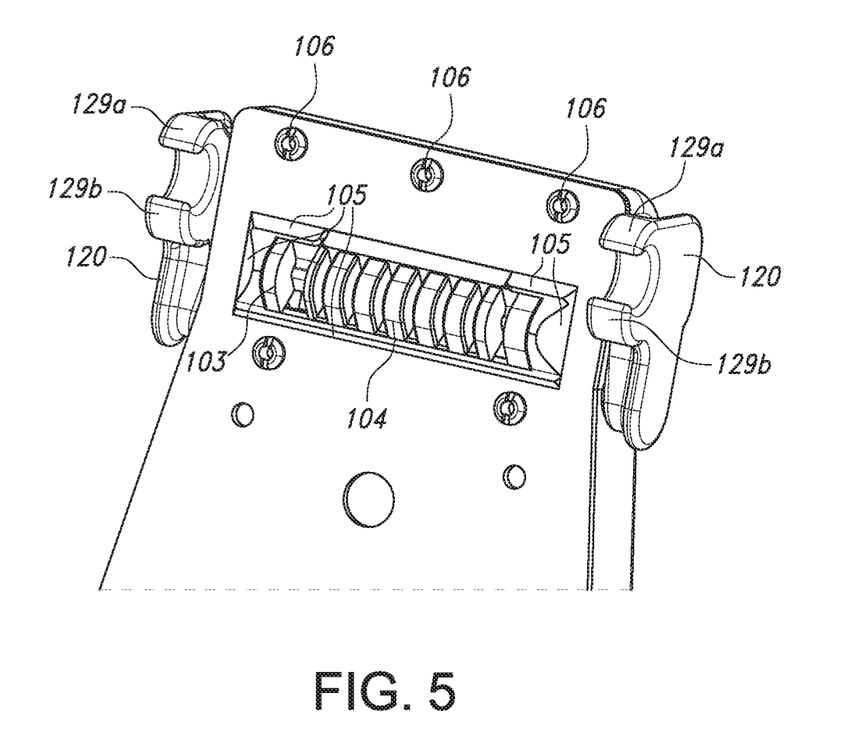
FIG. 5 illustrates an underside view of the front portion of the UAV fuselage shown in FIG. 1, wherein mechanical connectors are secured thereto.

As shown in FIGS. 4B and 5, in some implementations, the electrical connector 115 of each motor arm 110a, 110b may comprise registration sockets 116 configured to receive registration pins 106 extending from the underside of the fuselage 102. In this way, through the use of the registration pins 106, lateral movement of the electrical connector 115 of a motor arm 110a, 110b relative to the cooperating electrical connector 103 in the underside of the fuselage 102 is minimized or eliminated under normal flight conditions.

As shown in FIGS. 4B and 5, in some implementations, the electrical connector 115 of each motor arm 110a, 110b may also comprise release ramps 118 positioned about the electrical contacts 117 thereof that are configured to interface with cooperating release ramps 105 positioned about the electrical contacts 104 of the cooperating electrical connector 103 in the underside of the fuselage 102. In some implementations, in the event of a crash, the release ramps 105, 118 of a UAV 100 may be configured to facilitate the unplugging of an electrical connector 115 of a motor arm 110a, 110b from the cooperating electrical connector 103 in the underside of the fuselage 102. In some implementations, the release ramps 105, 118 may facilitate the separation of two cooperating electrical connectors 103, 115 when a sufficient lateral force is applied to a motor arm 110a, 110b. In this way, instead of placing a load (i.e., a lateral force) onto an electrical connector (e.g., 103, 115), the release ramps 105, 118 translate a side-to-side motion (i.e., a lateral force) into an unplugging force.

In some implementations, each release ramp 105 positioned about the electrical contacts 104 in the underside of the fuselage 102 and the corresponding release ramp 118 positioned about the electrical contacts 117 of a motor arm 110a, 110b are at complimentary angles. In some implementations, each release ramp 105 positioned about the electrical contacts 104 in the underside of the fuselage 102 and the corresponding release ramp 118 positioned about the electrical contacts 117 of a motor arm 110a, 110b are not at complimentary angles (not shown).

Although not shown in the drawings, it will be understood that suitable wiring connects the electrical components of the UAV 100 disclosed herein.

In some implementations, in the event of a crash, or other impact, a motor arm 110a, 110b of a UAV 100 may separate from the fuselage 102 by any one of the following ways, or combination thereof:

In some implementations, a lateral force exerted on a motor arm 110a, 110b and thereby the release ramps 105, 118 of cooperating electrical connectors 103, 115 may cause the electrical connector 115 of a motor arm 110a, 110b to unplug from the cooperating electrical connector 103 in the underside of the fuselage 102, and the registration pins 106. Further, in this event, the breakaway pegs 122 of the mechanical connectors 120 may either slide out of cooperating sockets 108 in the fuselage 102 or break, and/or another portion of the mechanical connector 120 may break.

In some implementations, due to the downward force generated by the release ramps 105, 118 during a crash, each motor arm 110a, 110b may be separated from the UAV 100 by being released from the mounting clamp 126 (i.e., pulled from between the curved branches 129a, 129b of the mounting clamp 126) of each mechanical connector 120 and/or by the breaking of the breakaway pegs 122.

In some implementations, a front-to-back force, or impact, may result in the separation of a motor arm 110a, 110b from the fuselage 102 in the same, or a similar, manner as described above.

In some implementations, an up/down force, or impact, may result in the separation of a motor arm 110a, 110b from the fuselage 102 in the same, or a similar, manner as described above.

Figure 6:
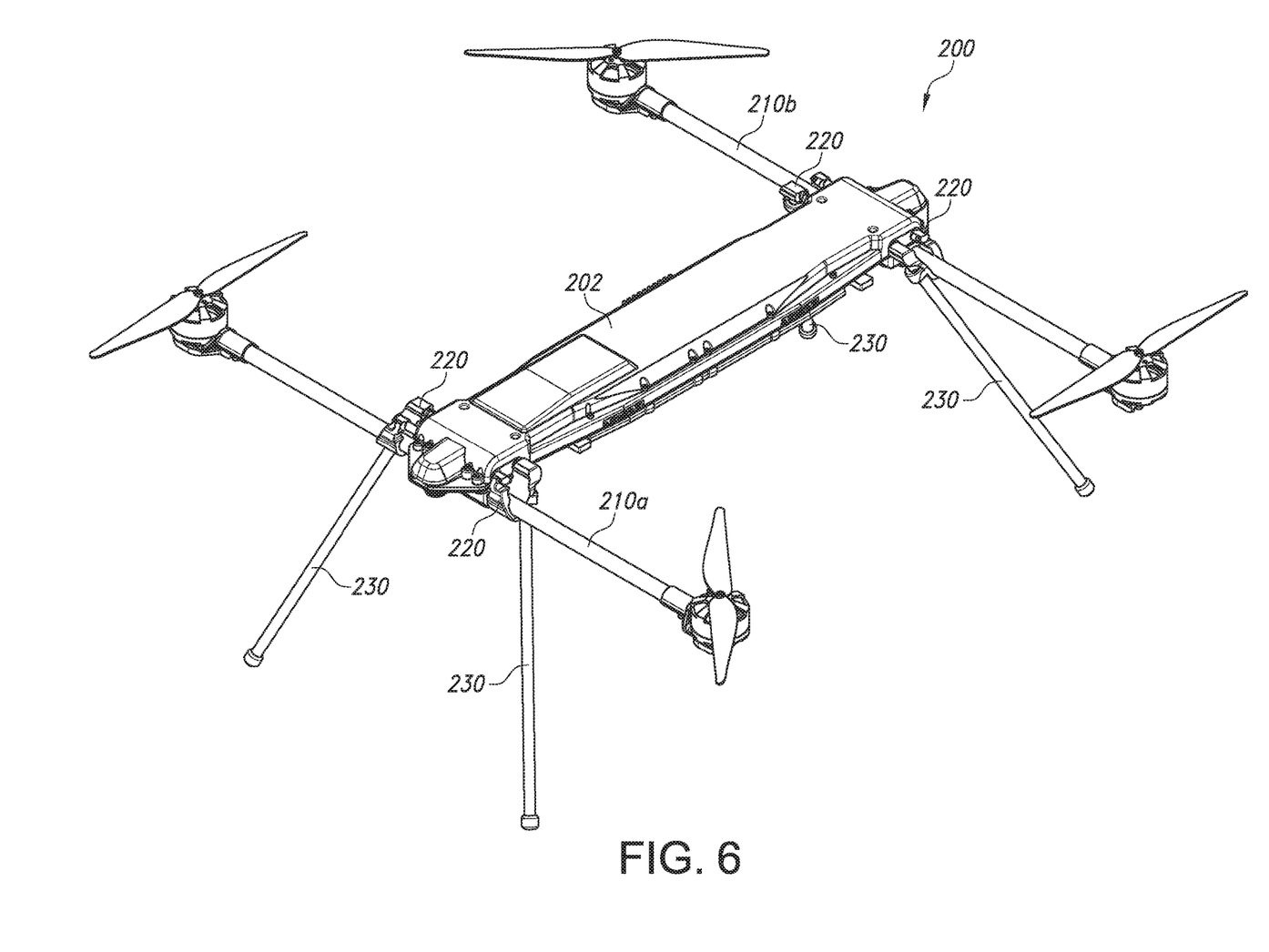
FIG. 6 illustrates another example unmanned aerial vehicle (UAV) provided with detachable motor arms according to the principles of the present disclosure.

FIG. 6 illustrates another example implementation of an unmanned aerial vehicle (UAV) 200 provided with detachable motor arms 210 in accordance with the present disclosure. In some implementations, the UAV 200 provided with detachable motor arms 210 is similar to the UAV 100 provided with detachable motor arms 110 discussed above but each mechanical connector 220 comprises a U-shaped body portion 221 having two flexible arms 229a, 229b (collectively flexible arms 229), each flexible arm 229a, 229b includes a breakaway peg 222a, 222b that extends from a distal end thereof (see, e.g., FIGS. 8A and 8B). Also, in some implementations, an interior side of the U-shaped body portion 221 is configured to fit about, and support, the tube 212 of a motor arm 210a, 210b (see, e.g., FIGS. 7A and 7B). In some implementations, each mechanical connector 220 may further comprise a leg 230 that extends therefrom by which the UAV 200 can rest on the ground when stopped.

Figure 7A:
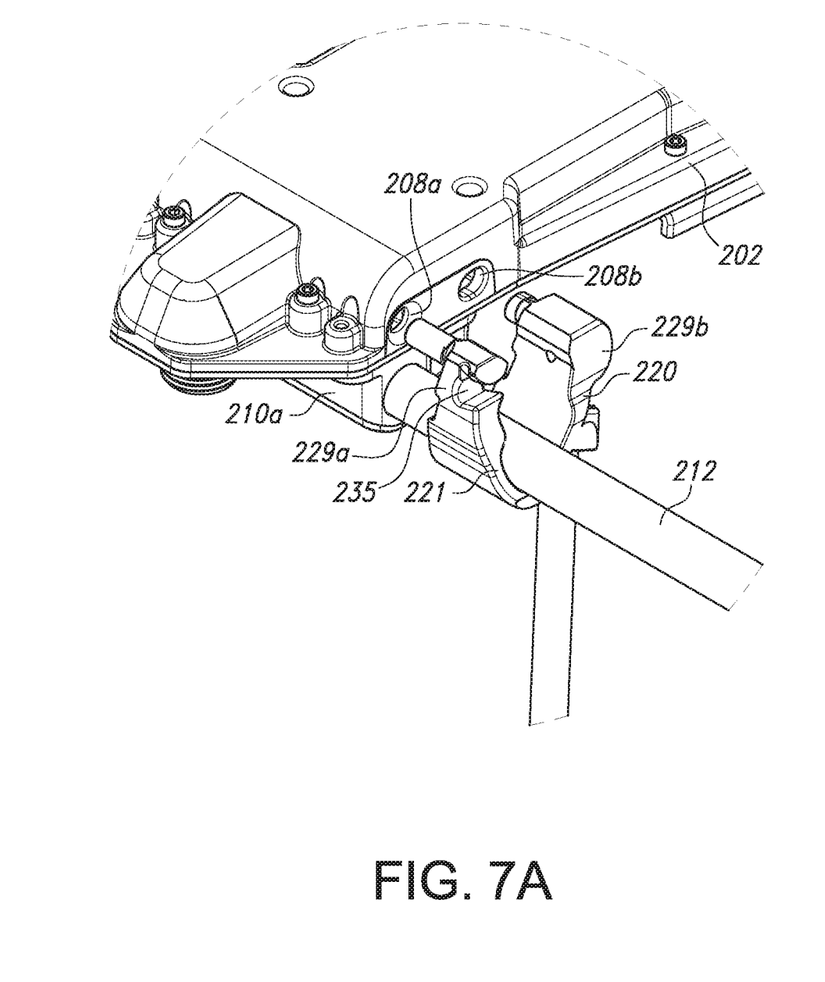
FIGS. 7A and 7B illustrate a detailed view of the front portion of the UAV provided with detachable motor arms shown in FIG. 6, wherein a mechanical connector securing a motor arm to the fuselage is shown exploded therefrom.
Figure 7B:
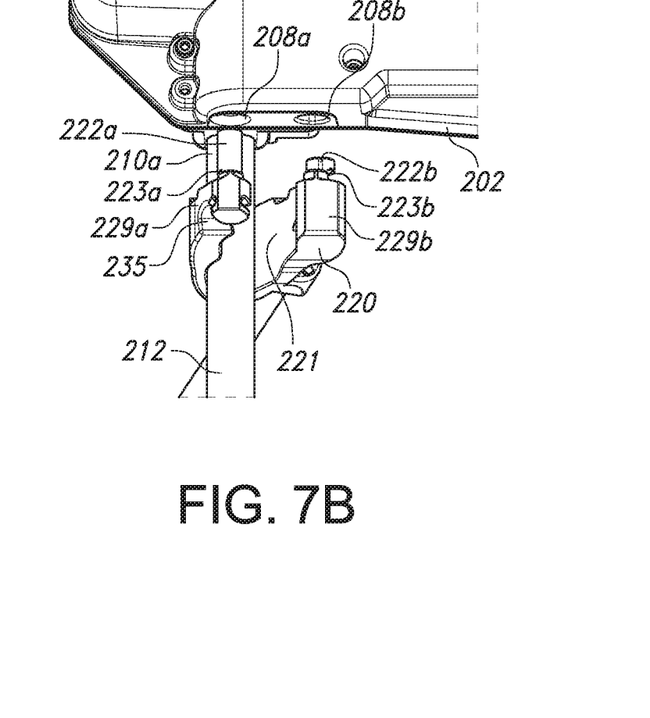
Figure 8A:
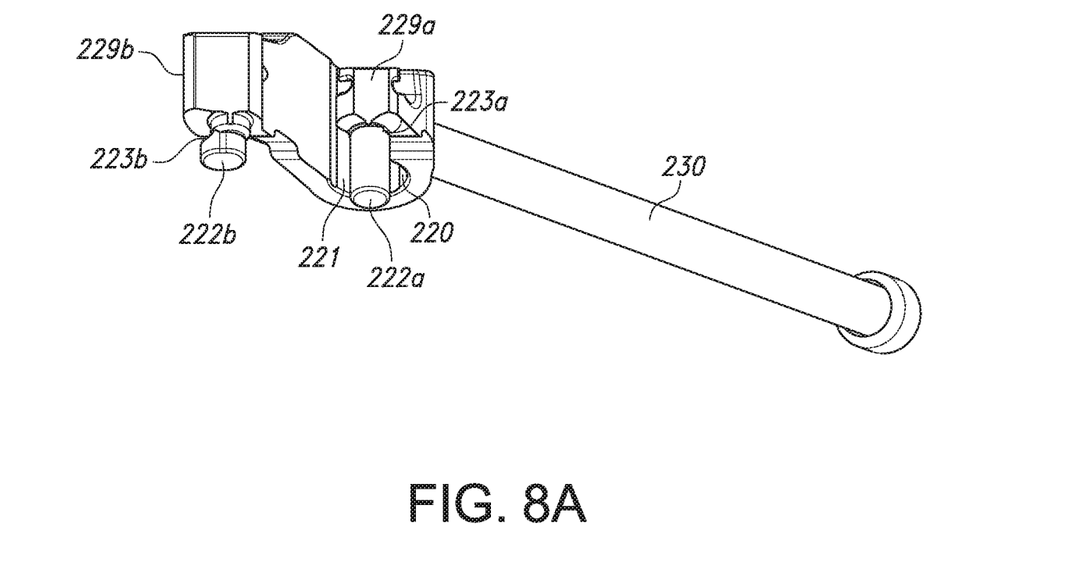
FIGS. 8A and 8B illustrate the mechanical connector shown in FIGS. 7A and 7B.
Figure 8B:
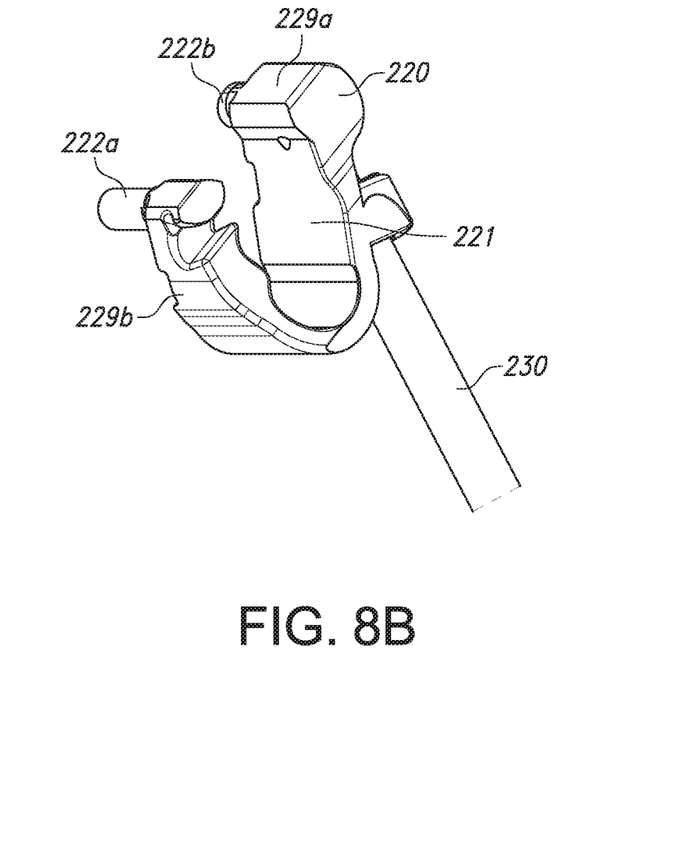

As shown in FIGS. 7A and 7B, in some implementations, a flexible arm (e.g., flexible arm 229a) may include a groove 235 therein that is located adjacent a distal end thereof. This groove 235 is configured (e.g., positioned) to weaken the flexible arm of a mechanical connector 220. In this way, the portion of the mechanical connector 220 weakened by the groove 235 can break in the event of a crash. In some implementations, a groove 235, or similar feature, may be located elsewhere on a flexible arm 229a, 229b of a mechanical connector 220. In some implementations, a mechanical connector 220 may not include a groove 235.

As shown in FIGS. 7A and 7B, in some implementations, the breakaway pegs 222a, 222b of each mechanical connector 220 are configured to be secured within cooperating sockets 208a, 208b located in a side of the fuselage 202 of the UAV 200. In this way, a motor arm 210a, 210b may be secured by a pair of mechanical connectors 220 to the fuselage 202 of the UAV 200 (see, e.g., FIG. 6). In some implementations, prior to inserting the breakaway pegs 222a, 222b into their cooperating sockets 208a, 208b, the user may exert a transverse effort on the flexible arms 229 of a mechanical connector 220 in a direction that moves them closer together (i.e., the user may squeeze the flexible arms 229a, 229b together). In this way, the breakaway pegs 222a, 222b may be aligned with their cooperating sockets 208a, 208b prior to insertion. In some implementations, once the breakaway pegs 222a, 222b have been fully inserted into their cooperating sockets 208a, 208b and the flexible arms 229 released, the flexible arms 229, due to their elastically deformable nature, spring back into position (i.e., recover their shape) and thereby cause the breakaway pegs 222a, 222b to engage with their respective sockets 208a, 208b. In this way, each mechanical connector 220 may be secured to the fuselage 202 of a UAV 200.

In some implementations, each breakaway peg 222a, 222b may be any shape suitable for being secured within a cooperating socket 208a, 208b in the fuselage 202 of the UAV 200. In some implementations, a breakaway peg 222a, 222b may include a lip 223a, 223b, or other feature, on a proximal end and/or a distal end thereof for cooperatively engaging with a socket 208a, 208b (see, e.g., FIGS. 7B and 8A). In some implementations, the breakaway pegs 222a, 222b are each configured to break (e.g., shaped and/or constructed from a suitable material) when sufficient force (e.g., torque) is applied thereto, such as during a crash. In this way, a motor arm 210a, 210b secured by a pair of mechanical connectors 220 to the fuselage 202 can separate therefrom during a crash and thereby minimize or prevent damage to the fuselage 202 and/or the motor arm 210a, 210b.

Figure 9:
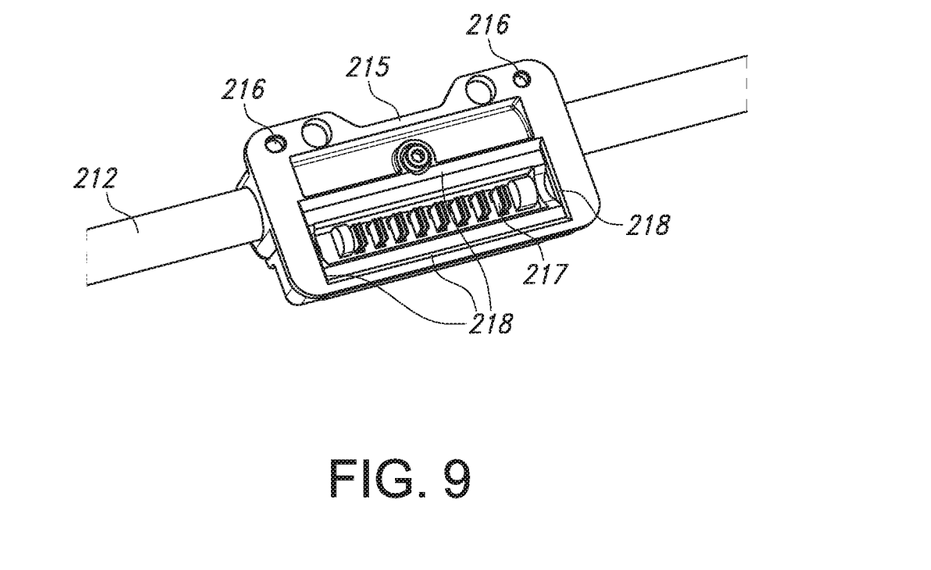
FIG. 9 illustrates a portion of another example motor arm according to the principles of the present disclosure, wherein the underside of an electrical connector is shown.
Figure 10:
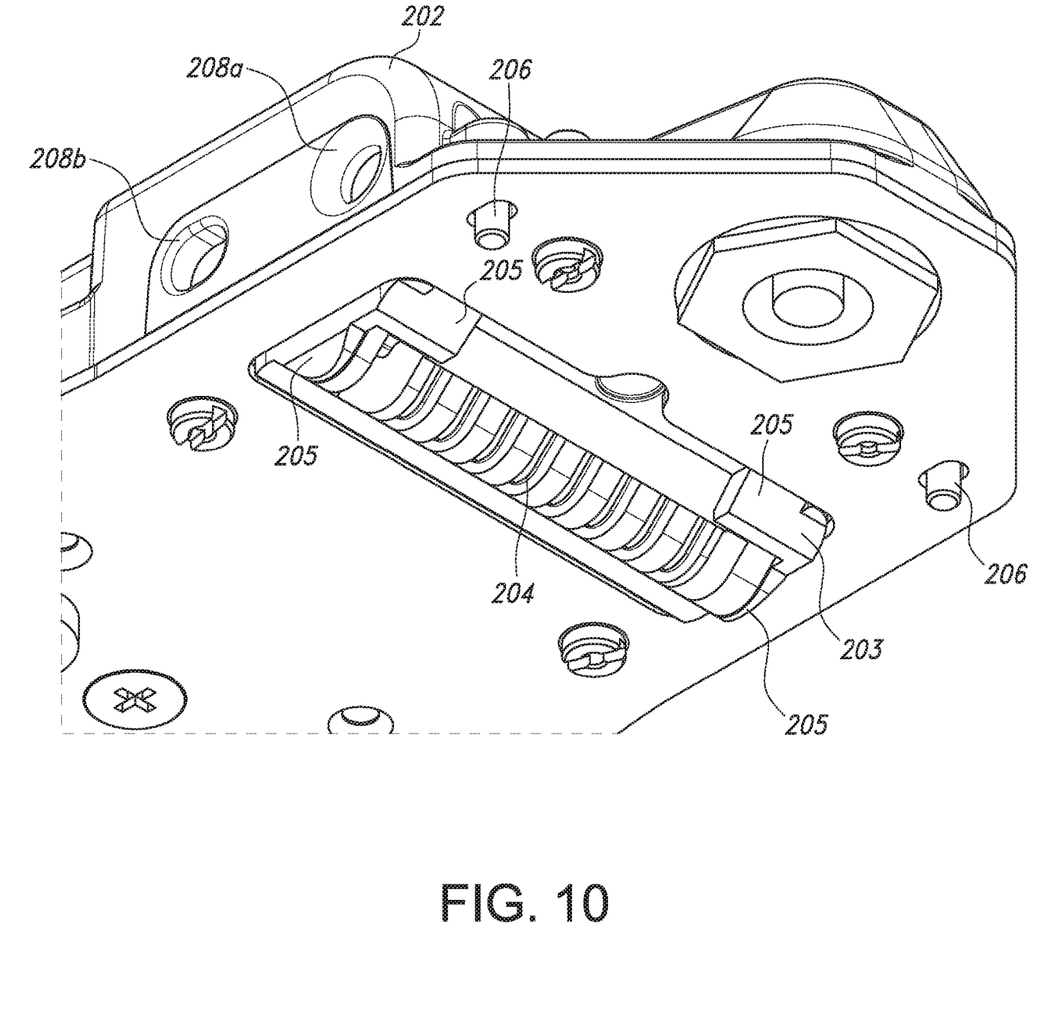
FIG. 10 illustrates an underside view of the front portion of the UAV fuselage shown in FIG. 6, wherein the motor arm has been removed.

As shown in FIGS. 9 and 10, in some implementations, the electrical connector 215 of each motor arm 210a, 210b may comprise registration sockets 216 configured to receive the registration pins 206 extending through openings in the fuselage 202. In this way, through the use of the registration pins 206, lateral movement of the electrical connector 215 of a motor arm 210a, 210b relative to the cooperating electrical connector 203 in the underside of the fuselage 202 is minimized or eliminated under normal flight conditions.

As shown in FIGS. 9 and 10, in some implementations, the electrical connector 215 of each motor arm 210a, 210b may also comprise release ramps 218 positioned about the electrical contacts 217 thereof that are configured to interface with cooperating release ramps 205 positioned about the electrical contacts 204 of the cooperating electrical connector 203 in the underside of the fuselage 202. In some implementations, in the event of a crash, the release ramps 205, 218 of a UAV 200 may be configured to facilitate the unplugging of an electrical connector 215 of a motor arm 210a, 210b from the cooperating electrical connector 203 in the underside of the fuselage 202. In some implementations, the release ramps 205, 218 may facilitate the separation of two cooperating electrical connectors 203, 215 when a sufficient lateral force is applied to a motor arm 210a, 210b. In this way, instead of placing a load (i.e., a lateral force) onto an electrical connector (e.g., 203, 215), the release ramps 205, 218 translate a side-to-side motion (i.e., a lateral force) into an unplugging force.

In some implementations, each release ramp 205 positioned about the electrical contacts 204 in the underside of the fuselage 202 and the corresponding release ramp 218 positioned about the electrical contacts 217 of a motor arm 210a, 210b are at complimentary angles. In some implementations, each release ramp 205 positioned about the electrical contacts 204 in the underside of the fuselage 202 and the corresponding release ramp 218 positioned about the electrical contacts 217 of a motor arm 210a, 210b are not at complimentary angles (not shown).

In some implementations, the U-shaped body portion 221 of each mechanical connector 220 may include a socket therein, one end of a leg 230 may be secured within the socket.

Although not shown in the drawings, it will be understood that suitable wiring connects the electrical components of the UAV 200 disclosed herein.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

The invention claimed is:

1. An unmanned aerial vehicle comprising:
    a fuselage, a first motor arm and a second motor arm detachably secured to the fuselage, each motor arm is detachably secured to the fuselage by two mechanical connectors and comprises a tube having a rotary wing propulsion system on each end and an electrical connector, positioned between the two rotary wing propulsion systems, configured to conductively interface with an electrical connector in an underside of the fuselage, the two mechanical connectors detachably securing each motor arm to the fuselage are configured to facilitate the separation of that motor arm from the fuselage during a crash;
    wherein each mechanical connector is a discrete component that comprises two breakaway pegs extending from a first side and a mounting clamp on a bottom end.

2. The unmanned aerial vehicle of claim 1, wherein the breakaway pegs of each mechanical connector are secured within cooperating sockets located in a side of the fuselage.

3. The unmanned aerial vehicle of claim 1, wherein the mounting clamp of each mechanical connector is configured to secure about the tube of a motor arm.

4. The unmanned aerial vehicle of claim 3, wherein the mounting clamp of each mechanical connector comprises two curved branches configured to resiliently deform when secured about the tube of a motor arm.

5. The unmanned aerial vehicle of claim 1, wherein the electrical connector of each motor arm includes registration sockets configured to receive registration pins extending from the underside of the fuselage.

6. The unmanned aerial vehicle of claim 1, wherein the electrical connector of each motor arm includes release ramps, positioned about electrical contacts, configured to interface with cooperating release ramps, positioned about electrical contacts, of the cooperating electrical connector in the underside of the fuselage.

7. An unmanned aerial vehicle comprising:
    a fuselage, a first motor arm and a second motor arm detachably secured to the fuselage, each motor arm is detachably secured to the fuselage by two mechanical connectors and comprises a tube having a rotary wing propulsion system on each end and an electrical connector, positioned between the two rotary wing propulsion systems, configured to conductively interface with an electrical connector in an underside of the fuselage, the two mechanical connectors detachably securing each motor arm to the fuselage are configured to facilitate the separation of that motor arm from the fuselage during a crash;
    wherein each mechanical connector is a discrete component that comprises a body portion having two flexible arms, each flexible arm includes a breakaway peg that extends from a distal end.

8. The unmanned aerial vehicle of claim 7, wherein the breakaway peg on each flexible arm is secured within a cooperating socket in a side of the fuselage.

9. The unmanned aerial vehicle of claim 8, wherein at least one breakaway peg of each mechanical connector includes a lip configured to engage with the cooperating socket in the fuselage.

10. The unmanned aerial vehicle of claim 7, wherein the body portion of each mechanical connector is configured to fit about, and support, the tube of a motor arm.

11. The unmanned aerial vehicle of claim 7, wherein the electrical connector of each motor arm includes registration sockets configured to receive registration pins extending from the underside of the fuselage.

12. The unmanned aerial vehicle of claim 7, wherein the electrical connector of each motor arm includes release ramps, positioned about electrical contacts, configured to interface with cooperating release ramps, positioned about electrical contacts, of the cooperating electrical connector in the underside of the fuselage.

13. The unmanned aerial vehicle of claim 7, wherein each mechanical connector further comprises a leg that extends from the body portion.

* * * * *